United States Patent

Gerlach et al.

[15] 3,663,779

[45] May 16, 1972

[54] SEALED ELECTRICAL PACKAGE

[72] Inventors: Richard K. Gerlach, Rolling Hills Estates; Meryl E. Miller, Palos Verdes Peninsula, both of Calif.

[73] Assignee: Datanetics Corporation, Redondo Beach, Calif.

[22] Filed: May 12, 1969

[21] Appl. No.: 823,785

[52] U.S. Cl. .......... 200/168 G, 200/86 R

[51] Int. Cl. .......... H01h 9/04

[58] Field of Search .......... 200/168 G, 152.9, 86, 159 B, 200/83

[56] References Cited

UNITED STATES PATENTS

| | | | |
|---|---|---|---|
| 3,176,095 | 3/1965 | Conery | 200/83 |
| 3,308,253 | 3/1967 | Krakinowski | 200/86 X |
| 3,324,271 | 6/1967 | Schuck et al. | 200/168 G |
| 3,382,338 | 5/1968 | Arseneault et al. | 200/159 B |

*Primary Examiner*—H. O. Jones

*Attorney*—Christie, Parker & Hale

[57] ABSTRACT

A substantially sealed and pressure compensated electrical package including a limp bladder in fluid communication with a module having electrical switching elements, the bladder being capable of substantially stress free inflation and deflation in response to changes in external environment pressures, without any fluid exchange between the module and the environment, whereby protection against toxic atmospheres is provided and inadvertent switching due to environmental pressure changes is avoided.

24 Claims, 3 Drawing Figures

RICHARD K. GERLACH
MERYL E. MILLER
BY
Fulwider, Patton, Rieber, Lee, and Utecht
ATTORNEYS

SEALED ELECTRICAL PACKAGE

BACKGROUND OF THE INVENTION

This invention relates generally to electrical packaging and, more particularly, to a new and improved electrical package of relatively simple and economical construction providing pressure compensation for changes of environment and substantially preventing fluid exchange between the package and the environment.

Workers in the electrical arts, and particularly those dealing with products in the areas of microelectronics, sealed switching devices and electronic keyboard systems, have encountered a number of problems in connection with electrical circuit deterioration and inadvertent switching. Circuit deterioration typically occurs when relatively fragile circuit elements, e.g., plated substrates, encounter and react with relatively toxic atmospheres. Inadvertent switching may typically occur with relatively drastic changes in altitude, as in the case of airborne equipment. In this latter regard, sealed switches may be inadvertently operated because of changes in the fluid pressure of the external environment.

While the use of a relatively rigid, hermetically sealed case for an electrical package does serve to prevent fluid exchange between the electronics within the package and the external environment, such hermetic devices are relatively difficult and expensive to manufacture, and the reliability of the hermetic seal decreases substantially when the package is subjected to physical stress such as rough handling, vibration or extremely high pressure differentials between the inside of the package and the external environment. In addition, hermetic sealing may not be feasible, in a practical sense, for some types of apparatus, as in the case of switches employing flexible diaphragms actuated by external members such as data keys.

It will be apparent, therefore, that there has been a long existing need in the electrical art for a relatively simple, relatively low cost, yet highly reliable electrical packaging means for minimizing fluid exchange between the electrical contents of the package and the environment while simultaneously preventing inadvertent switching due to environmental pressure changes. The present invention clearly satisfies this need.

SUMMARY OF THE INVENTION

Briefly, and in general terms, the present invention provides a new and improved electrical package wherein a substantially sealed package includes a limp bladder in fluid communication with an electrical module or assembly to be protected, the dimensions of the bladder in relation to the total volume of trapped gas within the package being selected so that the bladder can inflate and deflate in a substantially stress free manner in response to pressure changes in the environment external to the package.

In a presently preferred embodiment of the electrical package of the present invention, by way of example and not necessarily by way of limitation, a sealed, limp bladder completely encases the electrical module being protected and thereby effectively shields the module against the entry of moisture, dust, toxic gas and the like from the external environment.

The limp bladder is preferably fabricated of an elastomeric material, and the dimensions of the bladder are selected so that expansion of the bladder by entrapped gas, under the most extreme pressure differential conditions expected to be encountered by the electrical package, will cause little or no tensile stress in the walls of the bladder.

Where extreme pressure differentials are involved, the stress free, expanded volume of the bladder may be increased by means of a second limp bladder, in fluid communication with the first bladder encasing the electrical module. The second bladder may include a plurality of cascaded limp bladder sections in a bellows-type arrangement which adds its own stress free volumetric expansion capability to that of the first bladder.

The electrical package of the present invention provides a relatively simple, relatively inexpensive, yet compact and highly reliable means for protecting electrical modules, and particularly those including pressure actuated switch elements, against the deleterious effects of pressure changes and fluid exchange between the module and its external environment.

The above and other objects and advantages of the invention will be better understood by reference to the following more detailed description, when considered in connection with the accompanying drawing of an illustrative embodiment.

DESCRIPTION OF THE PREFERRED EMBODIMENT

Figure 1:
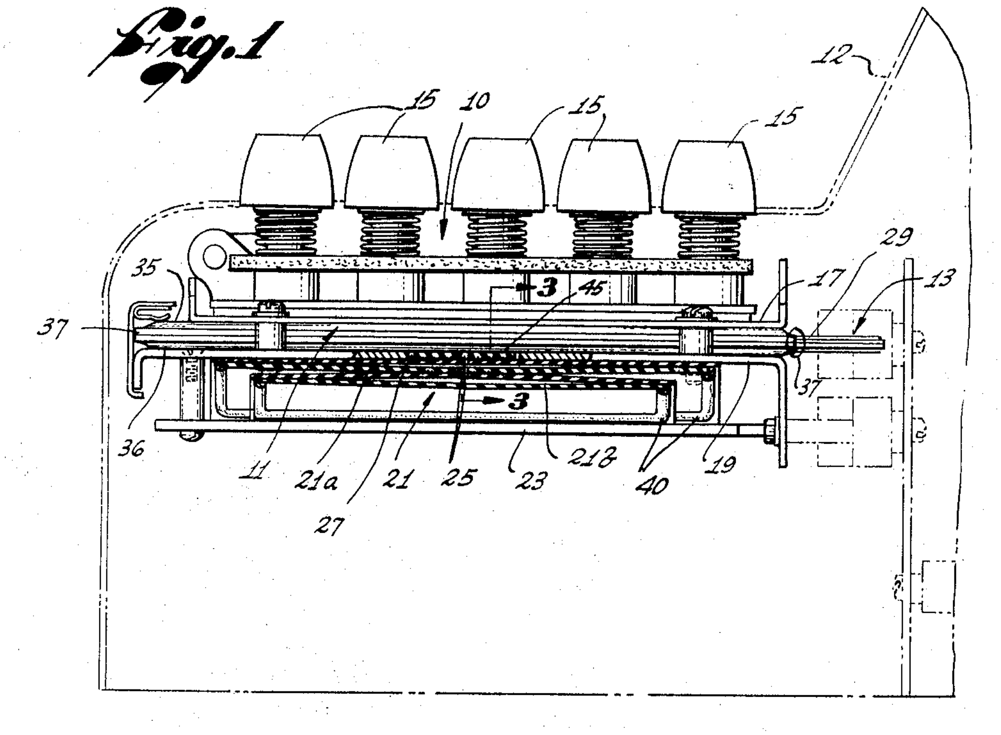
FIG. 1 is an elevational view, with portions shown in section, of an electronic keyboard system embodying an electrical package constructed in accordance with the present invention, the bladder system being shown in a substantially deflated state.

Referring now to the drawing, and particularly to FIG. 1 thereof, there is shown an electronic keyboard system, designated generally by the reference numeral 10, embodying an electrical package, designated generally by the reference numeral 11, the electrical package embodying the novel limp bladder construction features of the present invention. Although the invention is described and is particularly adaptable for use with electronic keyboards and sealed switch devices, it is to be understood that its use is not so limited, and it may also be used for the packaging of other types of electrical apparatus.

The keyboard 10 and its associated electronic package 11 may be mounted in any appropriate manner within a console or cabinet 12, shown in phantom in FIG. 1. Typical mounting hardware is also shown in FIG. 1 and denoted generally by the reference numeral 13. The details of the cabinet 12 and mounting hardware 13 form no part of the present invention and are not, therefore, described in any further detail.

The keyboard 10 includes a plurality of individual data key assemblies 15 which are pressure actuated to cause electrical switching to occur within the electrical package 11. The keyboard 10 is appropriately mounted, as by a suitable adhesive or the like, upon a base plate 17 directly above the electrical package 11.

The electrical package 11 is supported between the keyboard base plate 17 and a chassis plate 19. In the particular embodiment of the electrical package 11 shown in FIG. 1, a supplementary, bellows-type limp bladder 21 is supported below the chassis plate 19 and is contained between the latter plate and a bottom plate 23.

The bladder 21, as shown in FIG. 1, is in a limp, deflated state. The bladder 21 is sealed along all of its peripheral edges and is in fluid communication with the interior of the electrical package 11 by means of a plurality of internal apertures 25 in the bladder and aperture 27 in the chassis plate 19.

Figure 3:
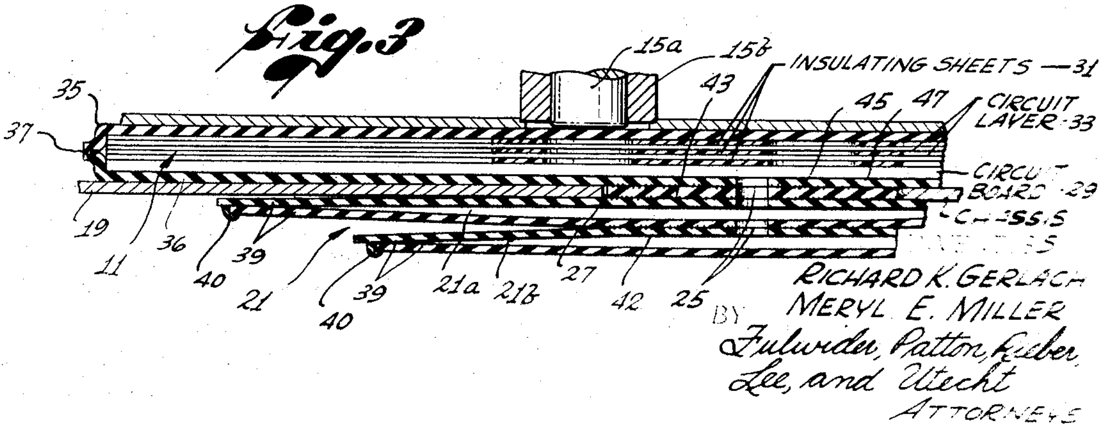
FIG. 3 is an enlarged, fragmentary sectional view, taken substantially along the line 3—3 in FIG. 1, and showing the bladder system in an inflated state.

As best observed in FIG. 3, the electrical package 11 typically includes an etched circuit board 29 in a sandwich subassembly structure including a plurality of insulating sheets 31 and thin circuit layers 33. The insulating sheets 31 are typically of thin polyester film such as Mylar, manufactured by E. I. duPont de Nemours & Co., Inc., whereas the circuit layers 33 may comprise etched circuits upon a thin polyester film substrate of Mylar or the like. The insulating sheets 31 have aligned apertures in selected locations so that pressure actuation by selected keys 15 (FIG. 1) will bring about electrical contact between various of the circuit layers 33 and the circuit board 29. As shown in FIG. 3, the latter switching is accomplished by a key plunger 15*a* sliding in an appropriate guide sleeve 15*b*.

Figure 2:
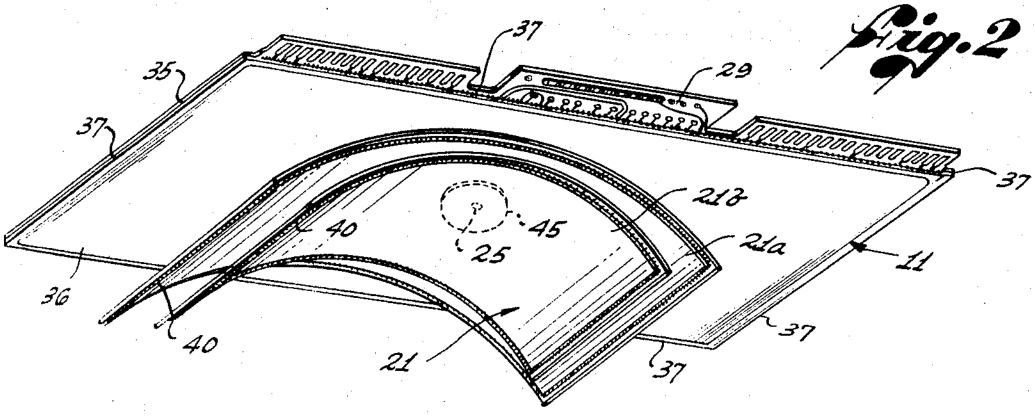
FIG. 2 is a perspective view of the electrical package utilized in the keyboard system shown in FIG. 1.

Referring now to FIGS. 1, 2 and 3, the electronic sandwich subassembly comprising insulating sheets 31, circuit layers 33 and the circuit board 29 are contained within a sealed outer casing formed by a pair of upper and lower elastomer sheets 35, 36 which are sealed along all of their peripheral edges 37 by means of an appropriate sealant material.

The elastomer sheets 35, 36 are typically fabricated of silicone rubber or the like, and the peripheral edges 37 may be sealed with continuous beads of silicone rubber such as the room temperature vulcanizing silicone rubber sealant materials known as RTV.

The casing defined by the elastomer sheets 35, 36 is itself a limp bladder which protects the contents of the electrical package 11 against moisture, dust and fluid exchange with the external environment. In addition, when the pressure in the external environment drops, air trapped within the package 11 will expand and inflate the bladder until the pressure differential between the inside and the outside of the package is reduced to substantially zero. While the expansion of the limp bladder casing defined by the sheets 35, 36 is volumetrically small in an absolute sense, it is large in a relative sense when compared with the small volume, typically 0.1 cubic centimeters, of trapped gas within the package 11 at normal pressure and temperature.

By using an elastomeric casing, the bladder can stretch slightly under extreme pressure differential conditions with minimum danger of stress sufficient to rupture the seals at the edges 37. However, it is preferred that the dimensions of the package 11 be selected so that the limp bladder experiences only substantially stress free inflation with minimal stretching of the elastomer sheets 35, 36.

Where extreme pressure differentials may be encountered by the electrical package 11, it is desirable to increase the stress free volumetric capacity of the bladder defined by the sheets 35, 36 through the use of additional limp bladders. The preferred embodiment of the invention shown in FIGS. 1, 2 and 3, utilizing the bellows-type bladder 21 is an example of such an arrangement. The limp bladder 21 includes a pair of bladder sections 21*a* and 21*b* shown in their deflated states in FIGS. 1 and 2 and shown in their inflated states in FIG. 3.

Each of the limp bladder sections 21a and 21b are fabricated of a pair of elastomer sheets 39, the pair of sheets for each bladder section being joined together and sealed along all of their peripheral edges by means of a continuous bead 40 of silicone rubber or the like.

The limp bladder sections 21*a*, 21*b* are in fluid communication with each other and with the bladder defined by the elastomer sheets 35, 36 via the internal apertures 25 previously described. The lower bladder section 21*b* is secured to the upper bladder section 21*a* by means of a suitable silicone sealant adhesive, such as RTV, along the surface area immediately adjacent the aperture 25, as at the area designated by the reference numeral 42 in FIG. 3. Similarly, the upper elastomer sheet 39 of the bladder section 21*a* is secured by a suitable sealing adhesive at 43 to an apertured washer 45 seated within the aperture 27 in the chassis plate 19. The washer 45 is, in turn, secured by a sealing adhesive at 47 to the underside of the elastomer sheet 36.

It will be apparent that the limp bladder 21 adds its own substantially stress free volumetric expansion capability to the lower capacity bladder defined by the elastomeric sheets 35, 36. The dimensions of the limp bladder system are preferably selected, however, so that expansion of the limp bladders under the most extreme pressure differential conditions expected to be encountered by the electrical package 11 will cause very little or no tensile stress in the various elastomer sheets 35, 36, 39 defining the bladder walls.

The improved electrical package 11 of the present invention is characterized by relatively simple construction, low cost, compactness and high reliability. The limp bladder construction provides a substantially sealed electrical package which very effectively minimizes fluid exchange between the electrical contents of the package and its environment, while simultaneously preventing inadvertent switching due to environmental pressure changes. For example, electrical packages constructed in accordance with the present invention permit reliable operation at elevations in excess of 50,000 feet, with less than 0.003 pounds per square inch (psi) pressure differential between the interior of the electrical package and the external environment.

It will be apparent from the foregoing that, while particular forms of the invention have been illustrated and described, various modifications can be made without departing from the spirit and scope of the invention.

We claim:

1. An electrical package, comprising:
electrical apparatus; and
bladder means in fluid communication with said electrical apparatus for pressure compensating and substantially sealing said electrical apparatus against the fluid environment external to the package, said bladder means being normally in a limp, deflated state, and the dimensions of said bladder means enabling substantially stress free inflation of said bladder means in pressure compensating said electrical apparatus.

2. An electrical package as set forth in claim 1, wherein said electrical apparatus includes at least one switching device.

3. An electrical package as set forth in claim 1, wherein said electrical apparatus includes at least one electrical switching means adapted to be actuated by additional means external to the package.

4. An electrical package as set forth in claim 1, wherein said bladder means includes:
a bladder casing containing said electrical apparatus; and
a bladder bellows in fluid communication with said bladder casing.

5. An electrical package, comprising:
electrical apparatus; and
sealed elastomeric bladder means in fluid communication with said electrical apparatus for pressure compensating and substantially sealing said electrical apparatus against the fluid environment external to the package, at least a portion of said bladder means encasing said electrical apparatus.

6. An electrical package as set forth in claim 5, wherein said bladder means is normally in a limp, deflated state, and the dimensions of said bladder means enable substantially stress free inflation of said bladder means in pressure compensating said electrical apparatus.

7. An electrical package as set forth in claim 6, wherein said electrical apparatus includes at least one switching device.

8. An electrical package as set forth in claim 6, wherein said electrical apparatus includes at least one electrical switching means adapted to be actuated by additional means external to the package.

9. An electrical package as set forth in claim 7, wherein said bladder means includes:
a bladder casing containing said electrical apparatus; and
a bladder bellows in fluid communication with said bladder casing.

10. An electrical package, comprising:
electrical apparatus;
a sealed, flexible first bladder means encasing said electrical apparatus; and
a sealed, flexible, normally limp second bladder means in fluid communication with said first bladder means.

11. An electrical package as set forth in claim 10, wherein said first bladder means comprises a pair of elastomeric sheets joined together along their peripheral edges.

12. An electrical package as set forth in claim 10, wherein said second bladder means includes at least one bladder section defined by a pair of elastomeric sheets joined together along their peripheral edges.

13. An electrical package as set forth in claim 10, wherein said second bladder means includes a plurality of normally limp bladder sections defining a normally limp bladder bellows.

14. An electrical package as set forth in claim 10, wherein said electrical apparatus includes at least one switching device.

15. An electrical package as set forth in claim 12, wherein said electrical apparatus includes at least one electrical switching means adapted to be actuated by additional means external to said first bladder means.

16. An electrical package, comprising:

a multilayer electrical circuit assembly, said circuit assembly including at least one circuit portion adapted to be switched by means external to the package; and substantially sealed, elastomeric, normally limp bladder means, at least a portion of said bladder means encasing said circuit assembly.

17. An electrical package as set forth in claim 16, wherein said bladder means includes:

a bladder casing containing said circuit assembly; and a bladder bellows in fluid communication with said bladder casing.

18. An electrical package as set forth in claim 17, wherein said bladder casing comprises a pair of elastomeric sheets joined together along their peripheral edges; and said bladder bellows comprises at least one bladder section defined by a pair of elastomeric sheets joined together along their peripheral edges.

19. An electrical package as set forth in claim 18, wherein all of said elastomeric sheets are of silicone rubber sealed at their respective edges with a silicone rubber sealant.

20. An electrical package, comprising: electrical apparatus; and bladder means in fluid communication with said electrical apparatus for pressure compensating and substantially sealing said electrical apparatus against the fluid environment external to the package, said bladder means including a bladder casing containing said electrical apparatus and a bladder bellows in fluid communication with said bladder casing.

21. An electrical package as set forth in claim 16, wherein said bladder means includes a bladder bellows in fluid communication with said circuit assembly and said bladder bellows comprises at least one bladder section defined by a pair of elastomeric sheets joined together along their peripheral edges.

22. An electrical package as set forth in claim 21, wherein said elastomeric sheets are of silicone rubber.

23. An electrical package as set forth in claim 16, wherein said bladder means includes a bladder casing containing said circuit assembly and said bladder casing comprises a pair of elastomeric sheets joined together along their peripheral edges.

24. An electrical package as set forth in claim 23, wherein said elastomeric sheets are of silicone rubber.

* * * * *